Figure 1:
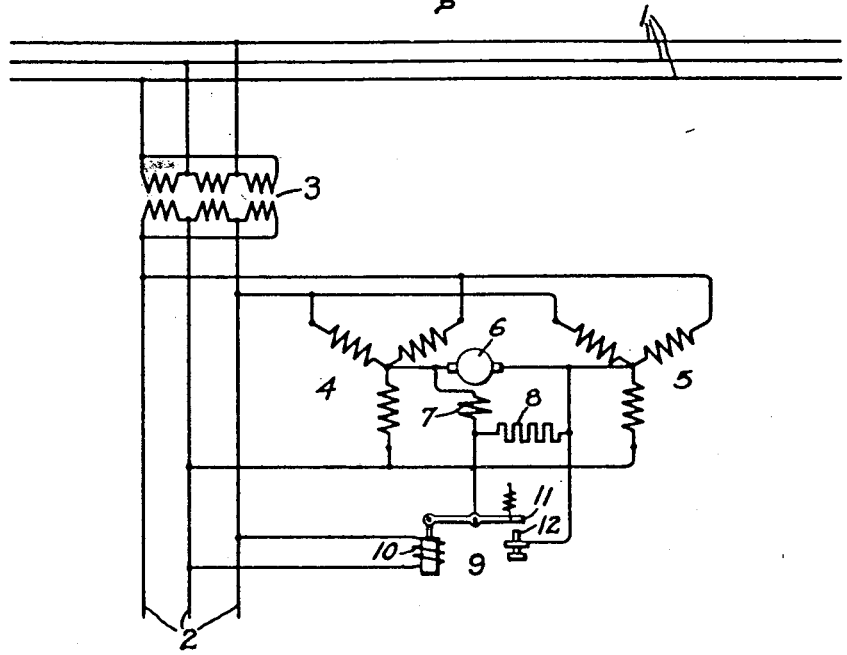

Dec. 25, 1928.

L. F. BLUME 1,696,591

SYSTEM OF DISTRIBUTION

Filed June 29, 1927

Inventor:
Louis F. Blume;
by
His Attorney.

Patented Dec. 25, 1928.

1,696,591

UNITED STATES PATENT OFFICE.

LOUIS F. BLUME, OF PITTSFIELD, MASSACHUSETTS, ASSIGNOR TO GENERAL ELECTRIC COMPANY, A CORPORATION OF NEW YORK.

SYSTEM OF DISTRIBUTION.

Application filed June 29, 1927. Serial No. 202,450.

My invention relates to systems of electric distribution, and more particularly to systems of distribution in which it is desirable to vary the reactive component of the current of the system under different conditions of operation.

An object of my invention is to provide an improved arrangement of inductive devices for controlling an electrical characteristic of an electric circuit by controlling the amount of inductive reactance connected in parallel thereto.

A further object of my invention is to provide an improved arrangement of inductive devices without movable parts for obtaining a variable inductive reactive load to compensate for the charging current of a transmission system and to prevent thereby appreciable rises in voltage when the load on the system is reduced to such an extent that the charging current would otherwise cause considerable variation in voltage at the receiving end or at points along the line.

It has been proposed heretofore to use non-saturated or saturated static inductive devices such as reactors in parallel with transmission lines for lessening the difficulties experienced from electrostatic capacity, but so far as is known, none of the devices proposed or used have been arranged to provide a controllable variable inductive reactive load to compensate for the capacitive component of the load current of the transmission line in accordance with an electrical characteristic thereof.

One arrangement for carrying my invention into practice comprises inductive devices connected in parallel with the transmission line and regulated by a direct current saturating current which is controlled in response to an electrical characteristic of the transmission line. These inductive devices comprise two banks of star-connected windings with a direct current source interposed between the interconnected neutral points of the star-connected windings. It is known that the self induction of a coil connected to an alternating current circuit may be varied by varying the degree of saturation of the core of the coil by a direct current flux. For instance, if the core is highly saturated with direct current, the self induction is decreased and the current through the coil is increased, whereas, if the direct current flux is decreased or removed the degree of saturation is decreased, the self induction of the coil is correspondingly increased, and the current through the coil is decreased. Thus, by varying the direct current saturating current by controlling a characteristic such as the voltage of the direct current saturating source, the arrangement of inductive devices provides a controllable variable reactive load in parallel to the transmission line which is to be controlled.

My invention will be better understood from the following description taken in connection with the accompanying drawing, and its scope will be pointed out in the appended claims.

Figure 2:
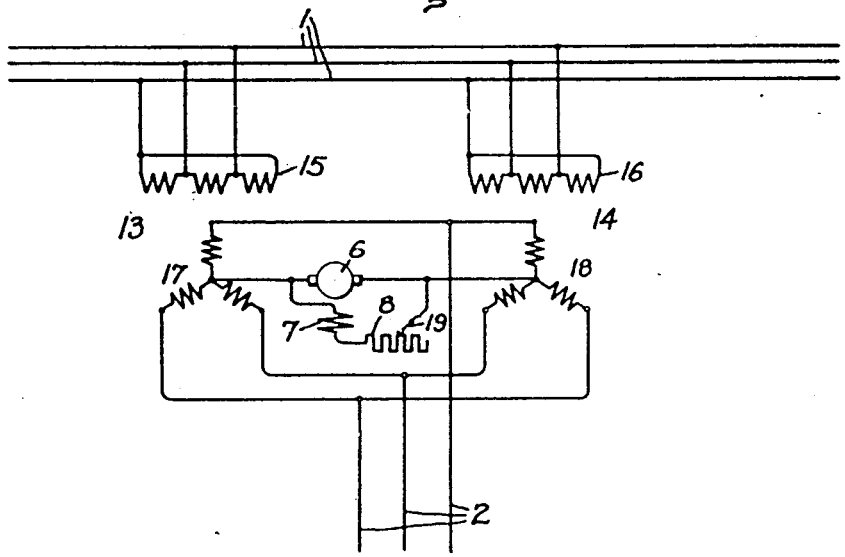

In the drawing, Fig. 1 is a diagrammatic representation of one embodiment of my invention, and Fig. 2 is a modification thereof.

Referring to Fig. 1 of the accompanying drawing, 1 denotes an electric circuit shown as a three-phase power transmission line, and 2 denotes a branch load circuit connected thereto through the intermediary of a step-down power transformer 3 comprising primary and secondary windings which are preferably delta-connected. Connected in parallel to the delta-connected secondary windings are two star-connected banks of inductive devices each bank of which may consist of three star-connected single phase reactors of well known construction. The neutral points of each bank of star-connected reactors are connected together through an independent source of electrical energy such as a direct current dynamo-electric machine 6. The dynamo-electric machine 6 is shown as a direct-current generator which may be driven by any convenient means (not shown) and is provided with a field winding 7 having a resistance 8 in series therewith whereby an electrical characteristic such as the voltage of the generator may be controlled to control the degree of saturation of the inductive devices.

A suitable arrangement for controlling the voltage of generator 6 consists in providing a vibratory type of regulator 9 connected to periodically short-circuit or open circuit a shunt circuit around the resistance and thereby regulate the voltage of the generator in a manner well known. The regulator 9 may comprise any suitable sensitive type of regulator such as a regulator of the Tirrill type, and, as shown merely for illustrative purposes, comprises an operating coil 10 which is connected to be responsive to the voltage of the transmission line 1 to control the operation of cooperating contacts 11 and 12 of the regulator which are connected across the resistance 8.

The operation of the arrangement shown is as follows: Let it be assumed that the transmission line is carrying normal load and that the voltage is at some predetermined normal value. Now, assume that the load is reduced and that the charging current of the line tends to increase the voltage of the transmission line at the point of connection of the regulating apparatus. As the voltage tends to rise, the cooperating contacts 11 and 12 are maintained in engagement a greater portion of the time so that the voltage of generator 6 is increased by the increase in field current. This action increases the direct current circulating between the two banks of reactors 4 and 5 and the degree of saturation of the reactors is thereby increased so that the inductive reactive load is increased in accordance with in the increase in direct current. This increase in inductive reactive load compensates for the charging current of the line and tends to maintain the voltage constant. If the load is increased to its normal value so that the inductive reactive component of the load current in the transmission line tends to neutralize the charging current, the voltage will tend to fall so that the cooperating contacts 11 and 12 will be in engagement a less portion of the time in accordance with the energization of operating coil 10 and the direct current saturating current will be correspondingly decreased in a manner to maintain the voltage of the line constant at the point of connection of the regulating apparatus.

It will be observed that the reactors are connected to the transmission line through a transformer having primary and secondary windings connected in delta. It is not essential that the secondary windings be used, but this arrangement is desirable in order that the third harmonic of voltage or current may be suppressed and prevented from flowing in the transmission line. The use of two star-connected banks of reactors in parallel substantially eliminates the second harmonics of voltage or current. Accordingly, the arrangement introduces a minimum amount of wave distortion either in voltage or current in the transmission line.

In Fig. 2 I have shown an embodiment of my invention which eliminates the use of separate reactors and utilizes the power transformer both as a means for transferring power from the main transmission line to a branch load circuit as well as providing a controllable variable reactive load in parallel to the transmission line for regulating purposes. Two banks of transformers 13 and 14 having delta-connected primary windings 15 and 16 are connected to the transmission line 1. The secondary windings 17 and 18 comprise two banks of parallel star-connected windings with a source of direct current such as the dynamo-electric machine 6 interposed in the connection between the neutral points of the two banks in a manner similar to the arrangement shown in connection with the reactors 4 and 5. Dynamo-electric machine 6 is provided with a field winding 7 having a resistance 8 in series therewith similarly to the arrangement shown in Fig. 1. The voltage of the dynamo-electric machine 6 may be controlled in the same manner as previously described in connection with the modification shown in Fig. 1 but for purposes of illustration I have merely shown an adjustable member 19 for controlling the direct current saturating current. The parallel-connected secondary windings are connected to supply the load circuit 2.

The operation of the arrangement shown in Fig. 2 is substantially the same as for the arrangement shown in Fig. 1, except that in this arrangement the saturation of the transformer core varies the amount of inductive reactive load imposed upon the system instead of the saturation of the auxiliary reactors as shown in Fig. 1.

While I have shown and described particular embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, an alternating current circuit, inductive means comprising a plurality of polyphase magnetic core-type inductive devices having interconnected electrical neutrals and connected in parallel with said circuit, an independent source of electrical energy for controlling the degree of saturation of said inductive means, and means for controlling an electrical characteristic of said independent source in accordance with an electrical characteristic of said alternating current circuit.

2. In combination, an alternating current circuit, polyphase inductive devices having electrical neutral connection points interconnected and connected in parallel with said circuit, a source of direct current for controlling the degree of saturation of said inductive devices, and means responsive to an electrical characteristic of said alternating current circuit for controlling an electrical characteristic of said source of direct current.

3. In combination, an alternating current circuit, a plurality of banks of parallel star-connected inductive devices connected to said circuit, a connection between the neutral points of said star-connected inductive devices, a source of direct current interposed in the connection between said neutral points, and means whereby the output of said direct current source may be controlled to vary the interchange of reactive energy between said inductive devices and said alternating current circuit.

4. In combination, an alternating current circuit, two banks of parallel star-connected inductive devices connected to said circuit, a connection between the neutral points of said star-connected inductive devices, a direct current dynamo-electric machine interposed in the connection between said neutral points for varying the degree of saturation of said inductive devices, and means responsive to a characteristic of said alternating current circuit for controlling said dynamo-electric machine.

5. In a system of electric distribution, a transmission line, a reactive load connected to said transmission line comprising an inductive device having two banks of parallel star-connected windings in its secondary circuit, a connection between the neutral points of said star-connected windings, and an independent source of electrical energy interposed in the connection between said neutral points for controlling the amount of reactive current consumed by said inductive device, and means responsive to the voltage of said transmission line for controlling the operation of said independent source of electrical energy.

6. In a system of electric distribution, a transmission line, a load circuit, transforming means having delta-connected secondary windings interconnecting said transmission line and said load circuit, two banks of parallel star-connected reactors connected in parallel to the secondary circuit of said transforming means, means comprising a direct-current dynamo-electric machine for interconnecting the neutral points of said star-connected reactors, a vibratory regulator responsive to the voltage of said transmission line for controlling the voltage of said dynamo-electric machine.

7. In combination, an alternating current circuit, inductive means connected to said circuit and comprising a plurality of groups of polyphase windings having interconnected electrical neutrals, an independent source of electrical energy interposed in the circuit between said electrical neutrals, and means for controlling the current traversing said independent source of electrical energy for controlling the degree of saturation of said inductive means.

In witness whereof, I have hereunto set my hand this 25th day of June, 1927.

LOUIS F. BLUME.